(12) United States Patent
Wada et al.

(10) Patent No.: US 6,320,742 B1
(45) Date of Patent: Nov. 20, 2001

(54) SOLID ELECTROLYTIC CAPACITOR, AND METHOD OF MANUFACTURING THE SAME

(75) Inventors: Tomohide Wada; Hiroshi Shimada, both of Kyoto; Yasuhiro Kobatake, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/505,425

(22) Filed: Feb. 16, 2000

(30) Foreign Application Priority Data

Feb. 17, 1999 (JP) .................................................. 11-038609

(51) Int. Cl.⁷ ...................................................... H01G 9/04
(52) U.S. Cl. ......................... 361/528; 361/528; 361/433; 361/508; 29/25.03; 29/570.1
(58) Field of Search ...................................... 361/528, 433, 361/321.3, 321.4, 508, 509, 512, 502; 29/25.03, 570.1

(56) References Cited

U.S. PATENT DOCUMENTS

| | | | |
|---|---|---|---|
| 4,085,435 | * | 4/1978 | Galvagni .............................. 361/433 |
| 4,110,815 | * | 8/1978 | Frade et al. ........................... 361/433 |
| 4,785,380 | * | 11/1988 | Harakawa et al. .................... 361/433 |
| 4,805,074 | | 2/1989 | Harakawa et al. . |
| 4,934,033 | * | 6/1990 | Harakawa et al. ............... 29/250.03 |
| 5,428,500 | | 6/1995 | Nishiyama et al. . |
| 5,432,029 | | 7/1995 | Mitate et al. . |
| 5,443,602 | | 8/1995 | Kejha . |
| 5,473,503 | | 12/1995 | Sakata et al. . |

FOREIGN PATENT DOCUMENTS

| | | |
|---|---|---|
| 59-23889 | 2/1984 | (JP) . |
| 60-137923 | 7/1985 | (JP) . |
| 63-158829 | 7/1988 | (JP) . |
| 62-165313 | 7/1989 | (JP) . |

* cited by examiner

Primary Examiner—Dean A. Reichard
Assistant Examiner—Nguyen T Ha
(74) Attorney, Agent, or Firm—Ratner & Prestia, PC

(57) ABSTRACT

The basic electric performance is same as or better than the prior art, and moreover occurrence of defective insulation due to the conductive high polymer layer reaching the anode lead-out part is prevented and occurrence of insulation breakdown is also prevented. Still more, the conventional productivity is not sacrificed. The solid electrolytic capacitor having such effects and its manufacturing method are obtained. It includes an anode electrode having a capacitor element part, forbidden band, and an anode lead-out part, a dielectric oxide layer disposed on the surface of the capacitor element part, a conductive high polymer layer disposed on the dielectric oxide layer, a conductor layer disposed on the conductive high polymer layer, an anode terminal electrically connected to the anode lead-out part, and a cathode terminal electrically connected to the conductor layer. The forbidden layer has a boundary portion disposed between the capacitor element part and the anode lead-out part in order to separate into the capacitor element part and anode lead-out part. The anode electrode has at least one undulated layer of roughened layer and porous layer.

21 Claims, 8 Drawing Sheets

SOLID ELECTROLYTIC CAPACITOR, AND METHOD OF MANUFACTURING THE SAME

FIELD OF THE INVENTION

The present invention relates to a solid electrolytic capacitor having a solid electrolyte layer, and a method of manufacturing the same.

BACKGROUND OF THE INVENTION

A conventional solid electrolytic capacitor of this type is structured as shown in FIG. 7. In FIG. 7, the solid electrolytic capacitor comprises a valve metal 5 having an anode lead-out part 2 and a capacitor element part 3, a dielectric oxide layer disposed on the valve metal, a conductive high polymer layer disposed on the dielectric oxide layer, a conductor layer disposed on the conductive high polymer layer, an anode terminal 6, a cathode terminal 7, and an external resin 8. The valve metal 5 has a roughened surface or porous layer processed by etching. The anode lead-out part 2 and capacitor element part 3 are separated from each other by a resist material 1 disposed on the surface of the valve metal 5. The dielectric oxide layer is formed by anodic oxidation. The anode terminal 6 is electrically connected to the anode lead-out part 2. The cathode terminal 7 is electrically connected to the conductor layer. The external resin 8 is formed by molding to cover the entire capacitor element.

Herein, the conductive high polymer layer is formed either by a method of forming by electrolytic oxidation polymerization by the use of monomer, or by a method of forming to chemical oxidation polymerization. The electrolytic oxidation polymerization is a method of forming a conductive high polymer layer on the surface of a manganese dioxide layer preliminarily formed on a dielectric oxide layer. The chemical oxidation polymerization is a method of forming a conductive high polymer layer directly on the surface of a dielectric oxide layer.

In the solid electrolytic capacitor shown in FIG. 7, however, the valve metal having the roughened layer or porous layer is divided into the anode lead-out part 2 and capacitor element part 3 by means of the resist material 1, but the conductive high polymer layer contacts with the anode lead-out part 2 through the gap 4 of the roughened layer or porous layer, and defective insulation may occur, or insulation breakdown may take place. Accordingly, it has been proposed to broaden the width of the resist material 1, or use a material having a high adhesion to the valve metal. In such proposals, too, it was difficult to obtain stable effects always in numerous production lots, and achieve a stable and low defective rate of insulation. It was also disadvantageous from the viewpoint of cost.

It is hence an object of the invention to present a solid electrolytic capacitor which can be manufactured in a relatively easy method, and is capable of preventing defective insulation due to conductive high polymer layer reaching up to the anode lead-out portion, and preventing occurrence of insulation breakdown, while maintaining the conventional excellent productivity.

SUMMARY OF THE INVENTION

The solid electrolytic capacitor of the invention comprises:
an anode electrode having a capacitor element part, forbidden band, and an anode lead-out part,
in which the forbidden band has a boundary portion placed between the capacitor element part and anode lead-out part so as to separate the capacitor element part and anode lead-out part,
a dielectric oxide layer disposed on the capacitor element part,
a conductive high polymer layer disposed above the dielectric oxide layer,
a conductor layer disposed above the conductive high polymer layer,
an anode terminal connected electrically to the anode lead-out part, and
a cathode terminal connected electrically to the conductor layer.

Preferably, the anode electrode has at least one undulated layer of roughened layer and porous layer.

Preferably, the anode electrode has a valve metal forming at least one layer of roughened layer and porous layer.

Preferably, the solid electrolytic capacitor further has a resist material disposed on the forbidden band.

The manufacturing method of solid electrolytic capacitor of the invention comprises:
(a) a step of feeding an anode electrode,
(b) a step of forming a forbidden band in the anode electrode in order to form a boundary portion between the capacitor element part and anode lead-out part,
(c) a step of forming a dielectric oxide layer on the capacitor element part,
(d) a step of forming a conductive high polymer layer above the dielectric oxide layer,
(e) a step of forming a conductor layer above the conductive high polymer layer,
(f) a step of connecting an anode terminal electrically to the anode lead-out part, and
(g) a step of connecting a cathode terminal electrically to the conductor layer.

Preferably, the step of feeding the anode electrode includes a step of forming at least one undulated layer of roughened layer and porous layer on the surface of the anode electrode.

Preferably, the anode electrode has a valve metal, and the step of feeding the anode electrode includes a step of forming at least one undulated layer of roughened layer and porous layer on the surface of the anode electrode.

Preferably, this method includes a step of disposing a resist material on the forbidden band.

In this constitution, a solid electrolytic capacitor having equivalent or superior basic electric performance as compared with the conventional product can be obtained in a relatively simple manufacturing method. It further prevents defective insulation caused by the conductive high polymer layer reaching the anode lead-out part. Occurrence of insulation breakdown is prevented. Moreover, the conventional productivity is not sacrificed. The solid electrolytic capacitor having such effects and its manufacturing method are obtained.

Figure 1A:
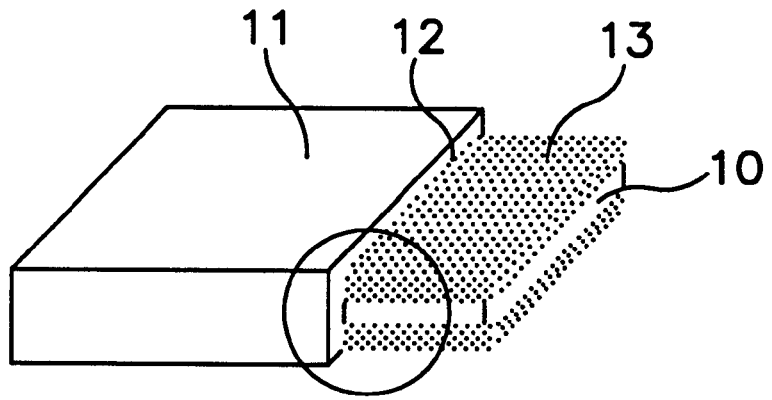
FIG. 1(a) is a perspective view showing a constitution of a solid electrolytic capacitor in an embodiment of the invention.

| Reference Numerals | |
|---|---|
| 10 | Anode electrode |
| 11,21,31,41,51 | Capacitor element part |
| 12,22,32,42,52 | Forbidden band |
| 19,59 | Silicone material |
| 13,23,33,43,54 | Anode lead-out part |
| 14,24,34,44,55 | Dielectric oxide layer |
| 15,25,35,45,56 | Conductive high polymer layer |
| 16,26,36,46,57 | Conductor layer |
| 53 | Resist tape |

DETAILED DESCRIPTION OF THE INVENTION

A solid electrolytic capacitor in an embodiment of the invention comprises a roughened layer or porous layer formed on the surface of a valve metal, a forbidden band for preventing permeation of conductive high polymer material for forming a boundary portion of at least the anode lead-out part and capacitor element part formed in this layer, a dielectric oxide layer, a conductive high polymer layer, and a conductor layer sequentially disposed on the surface of the capacitor element part separated by this forbidden band, and terminals connected electrically to the surface of the anode lead-out part and the conductor layer individually.

The roughed layer or porous layer has a undulated surface composed of concave portions and convex portions.

In this constitution, the forbidden band prevents permeation of conductive high polymer material. It hence prevents occurrence of defective insulation due to the conductive high polymer reaching up to the anode lead-out part, and further lowers the probability of reaching insulation breakdown substantially. Moreover, the solid electrolytic capacitor not sacrificing the conventional productivity is obtained.

Preferably, the forbidden band has a silicone material or a silicone diffused layer formed in contact with the surface of the roughened layer or porous layer. In this constitution, the above effects are particularly excellent.

Preferably, the silicone material or silicone diffused layer is formed by low molecular silicone of polysiloxane in a range of dimer to vigesimer of silicone. The polysiloxane has a skeleton of —(O—Si)n-O—, in which an alkyl group of R1 or R2 is linked to Si. The dimer is a structure in which "n" is "2", and the vigesimer is a structure in which "n" is "20".

The low molecular silicone in this range has a preferred viscosity, and therefore its low molecular silicone can be securely placed on the surface of both concave portions and convex portions of the roughened surface of the forbidden band. Moreover, the low molecular silicone in this range has an excellent heat resisting temperature for practical use. In this constitution, the above effects are obtained, and the effect of preventing permeation of conductive high polymer material is extremely improved.

Preferably, the forbidden band is formed by the compressed layer or molten condensed layer formed by compressing or condensing the undulated surface of the valve metal. That is, the compressed layer or molten condensed layer is processed so as to have a small surface area as compared with the surface area of the undulated surface of the valve metal. By reducing the step difference of the undulated surface, the surface area of the roughened layer or porous layer is extremely small. In this constitution, in addition to the aforesaid effects, the effect of preventing permeation of conductive high polymer material is extremely improved.

Preferably, the forbidden band has a splitting groove removed so as to expose the base material of the roughened layer or porous layer of the valve metal. In this constitution, aside from the above effects, the effect of preventing permeation of the conductive high polymer material is notably enhanced by the forbidden band.

In other embodiment of the invention, a solid electrolytic capacitor comprises a roughened layer or porous layer formed on the surface of a valve metal, a forbidden band for preventing permeation of conductive high polymer material for forming a boundary portion of at least the anode lead-out part and capacitor element part formed in this layer, a resist material disposed on this forbidden band, a dielectric oxide layer, a conductive high polymer layer, and a conductor layer sequentially disposed on the surface of the capacitor element part separated by this forbidden band, and terminals connected electrically to the surface of the anode lead-out part and the conductor layer individually.

The resist material is a material having an electric insulating property.

In this constitution, the forbidden band prevents permeation of conductive high polymer material. Moreover, the resist material securely prevents formation of the conductive high polymer layer over the forbidden band. In other words, both the forbidden band and the resist material prevent formation of the conductive high polymer material on the anode lead-out part. Therefore, it prevents occurrence of defective insulation due to the conductive high polymer reaching up to the anode lead-out part, and further lowers the probability of reaching insulation breakdown substantially. Moreover, the solid electrolytic capacitor not sacrificing the conventional productivity is obtained.

Preferably, the resist material has a tape composed of a heat resisting tape material, and a heat resisting adhesive applied on this heat resisting tape. As the heat resisting adhesive, in particular, silicone adhesive is preferred. This heat resisting adhesive is applied on the surface of the forbidden band. That is, a silicone diffused layer having the silicone adhesive disposed on the surface of convex portions and concave portions of the undulated surface of the forbidden band is disposed on the surface of the forbidden band. The silicone adhesive is a silicone compound containing Si in its chemical structure. In this constitution, aside from the above effects, the effect of preventing permeation of conductive high polymer material is extremely improved.

Preferably, the silicone diffused layer is formed by low molecular silicone containing polysiloxane in a range of dimer to vigesimer of silicone. In this constitution, the above effects are obtained, and the effect of preventing permeation of conductive high polymer material is stably obtained.

Preferably, the resist material has a tape composed of a heat resisting tape material, and a heat resisting adhesive applied on this tape material, and this tape is placed to cover the forbidden band, the tape width is broader than the width, of the forbidden band. In this constitution, the above effects are obtained. Further, it is further suppressed that the conductive high polymer layer is formed beyond the forbidden layer, and the effect of preventing permeation of conductive high polymer material is more stably obtained.

Preferably, the forbidden band has a compressed layer or molten condensed layer formed by pressurizing process, and has a small surface area as compared with the surface area of the undulated surface of the valve metal. In this constitution, the aforesaid effects are obtained. Further the surface area of the roughened layer or porous layer is extremely small. Hence, the effect of preventing permeation of conductive high polymer material is obtained very securely.

Preferably, the forbidden band is formed of a splitting groove formed so as to expose the base material of the roughened layer or porous layer of the valve metal. In this constitution, the above effects are obtained. Also, the effect of preventing permeation of the conductive high polymer material is more stably obtained.

Preferably, the valve metal is a foil. In this constitution, the distance from the surface of the roughened layer or the porous layer to the deeper part can be easily shortened. It is also easy to form a forbidden band from the surface of the roughened layer or porous layer to the inner parts. As a result, the above effects are obtained. Further, the effect of preventing permeation of conductive high polymer material is further stably obtained.

Preferably, the valve metal is composed of any one of at least aluminum, tantalum, niobium, zirconium, and titanium, or their composite or alloy material. In this constitution, the extremely excellent effects are obtained.

Preferably, the conductive high polymer layer is a electrolytic oxidation polymerization product of monomer and dopant, and the monomer is complex five-ring compound or its derivative, and the dopant is aryl sulfonic acid. In this constitution, the extremely excellent effects are obtained.

A manufacturing method of solid electrolytic capacitor according to an embodiment of the invention comprises (a) an anode processing step of forming an undulated surface such as roughened layer or porous layer on the surface of a valve metal, (b) a preparatory step of forming a forbidden band for preventing permeation of conductive high polymer material in the undulated surface of the valve metal in order to form a boundary portion at least between the anode lead-out part and capacitor element part, (c) an element forming step of forming a dielectric oxide layer, a conductive high polymer layer, and a conductor layer sequentially on the surface of the capacitor element part separated by the forbidden band, and (d) an after-treatment step of forming terminals on the surface of the anode lead-out part and conductor layer individually.

In this constitution, the forbidden band prevents the conductive high polymer material from permeating into the anode lead-out part. The solid electrolytic capacitor having such characteristics can be easily manufactured. It hence prevents occurrence of defective insulation due to the conductive high polymer layer reaching the anode lead-out part, and lowers the probability of leading to insulation breakdown substantially. Moreover, the solid electrolytic capacitor is obtained without sacrificing the conventional productivity.

Preferably, the preparatory step of forming the forbidden band includes a step of forming a silicone coat film on the undulated surface of the valve metal, and a control step of leaving the silicone coat film for a specified time in order to form a specified silicone diffused layer in the undulated surface. In this constitution, the silicone coat film permeates completely into the both surfaces of concave portions and convex portions of the undulated surface, and the silicone diffused layer is formed without gap on the undulated surface. As a result, the particularly excellent effects are obtained.

Preferably, the preparatory step of forming the forbidden band includes a step of forming by cutting and removing a part of the roughened layer or porous layer formed on the surface of the valve metal. As a result, the particularly excellent effects are obtained.

Preferably, the preparatory step of forming the forbidden band includes a step of forming by pressing and compressing a part of the roughened layer or porous layer formed on the surface of the valve metal. By this step, the surface area of the roughened layer or porous layer is extremely reduced by the forbidden band. Therefore, the particularly excellent effects are obtained. Moreover, the effect of preventing permeation of conductive high polymer material is notably improved.

Preferably, the preparatory step of forming the forbidden band includes a step of forming by melting and condensing a part of the roughened layer or porous layer formed on the surface of the valve metal. By this step, the surface area of the roughened layer or porous layer is extremely reduced by the forbidden band. Therefore, the particularly excellent effects are obtained. Moreover, the effect of preventing permeation of conductive high polymer material is notably improved.

In other embodiment of the invention, a manufacturing method of solid electrolytic capacitor comprises an anode processing step of forming a roughened layer or porous layer on the surface of a valve metal, a preparatory step of forming a forbidden band for preventing permeation of conductive high polymer material and forming a resist material on the forbidden band, in the roughened layer or porous layer of the valve metal in order to form a boundary portion at least between the anode lead-out part and capacitor element part, an element forming step of forming a dielectric oxide layer, a conductive high polymer layer, and a conductor layer sequentially on the surface of the capacitor element part separated by the forbidden band, and an after-treatment step of forming terminals on the surface of the anode lead-out part and conductor layer individually.

In this constitution, the solid electrolytic capacitor having the effect of preventing the conductive high polymer material from permeating into the anode lead-out part by the forbidden band is easily obtained. It hence securely prevents the resist layer from forming the conductive high polymer layer by surpassing the forbidden band. It therefore prevents occurrence of defective insulation due to the conductive high polymer layer reaching the anode lead-out part, and lowers the probability of leading to insulation breakdown substantially. Moreover, the solid electrolytic capacitor is obtained without sacrificing the conventional productivity.

Preferably, the preparatory step includes a step of adhering a tape coated with a heat resisting silicone adhesive on a heat resisting tape base material, to the roughened layer or porous layer formed on the surface of the valve metal, and a step of leaving the adhered tape for a specific time so that the forbidden band made of a specified silicone diffused layer may be formed in the roughened layer or porous layer. In this constitution, the same excellent effects are obtained.

Preferably, the preparatory step includes a step of forming the forbidden band made of a split groove by cutting and removing a part of the roughened layer or porous layer formed on the surface of the valve metal. In this constitution, the same excellent effects are obtained, and a step of adhering a resist tape so as to cover the forbidden band. It further prevents the resist material disposed on the forbidden band from forming the conductive high polymer layer by surpassing the forbidden band. Therefore, the effect of preventing permeation of conductive high polymer material is securely obtained.

Preferably, the preparatory step includes a step of forming the forbidden band having a compressed layer or molten condensed layer by pressing or compressing a part of the roughened layer or porous layer of the valve metal, and a step of adhering a resist tape so as to cover the forbidden band. In this constitution, the same excellent effects are obtained. Moreover, the surface area of the roughened layer or porous layer is extremely reduced by the forbidden band, so that the effect of preventing permeation of conductive high polymer material is securely obtained.

Exemplary Embodiment 1

Figure 1B:
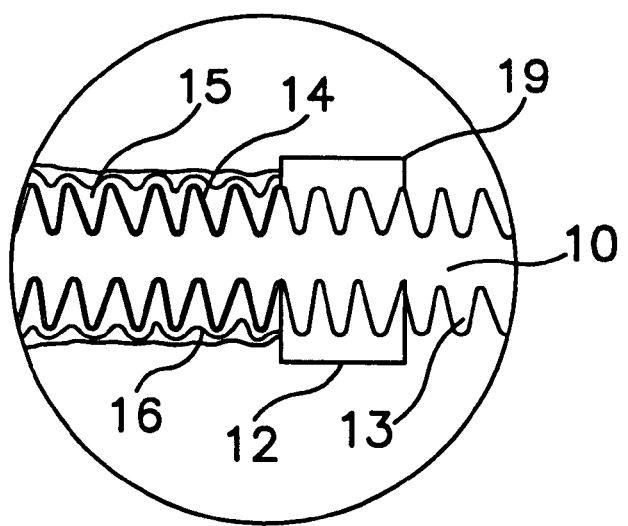
FIG. 1(b) is an essential magnified sectional view of the solid electrolytic capacitor shown in FIG. 1(a).

FIG. 1(*a*) is a perspective view showing a constitution of a solid electrolytic capacitor in an embodiment of the invention, and FIG. 1(*b*) is an essential magnified sectional view thereof. In FIG. 1(*a*) and FIG. 1(*b*), a solid electrolytic capacitor includes an anode electrode 10, a dielectric oxide layer 14, a conductive high polymer layer 15, and a conductor layer 16. The anode electrode 10 has a capacitor element part 11, a forbidden band 12, and an anode lead-out part 13.

This anode electrode 10 is made of an aluminum foil, and this aluminum foil has a roughened surface. This roughened surface has an undulated surface made of concave portions and convex portions. The anode electrode 10 is separated from the anode lead-out part 13 by the forbidden band 12. The forbidden band 12 has a silicone material 19 disposed on the surface of the concave portions and convex portions of the undulated surface. The silicone material 19 has a low molecular silicone having polysiloxane in a range of dimer to vigesimer of silicone. The dielectric oxide layer 14 is formed on the surface of the capacitor element part 11. On the surface of this capacitor element part 11, the conductive high polymer layer 15 of polypyrrole is formed by electrolytic oxidation polymerization. On this conductive high polymer layer 15, a conductor layer 16 made of carbon layer and silver paint layer is laminated and formed sequentially.

To confirm the effect of the forbidden band 12 having the silicone material 19, samples were prepared by varying the standing time until the silicone material 19 was disposed until the next step was started. That is, samples were made in four conditions of standing time from forming the silicone material 19 until next step, 24 hours, 48 hours, 96 hours, and 144 hours.

Figure 7:
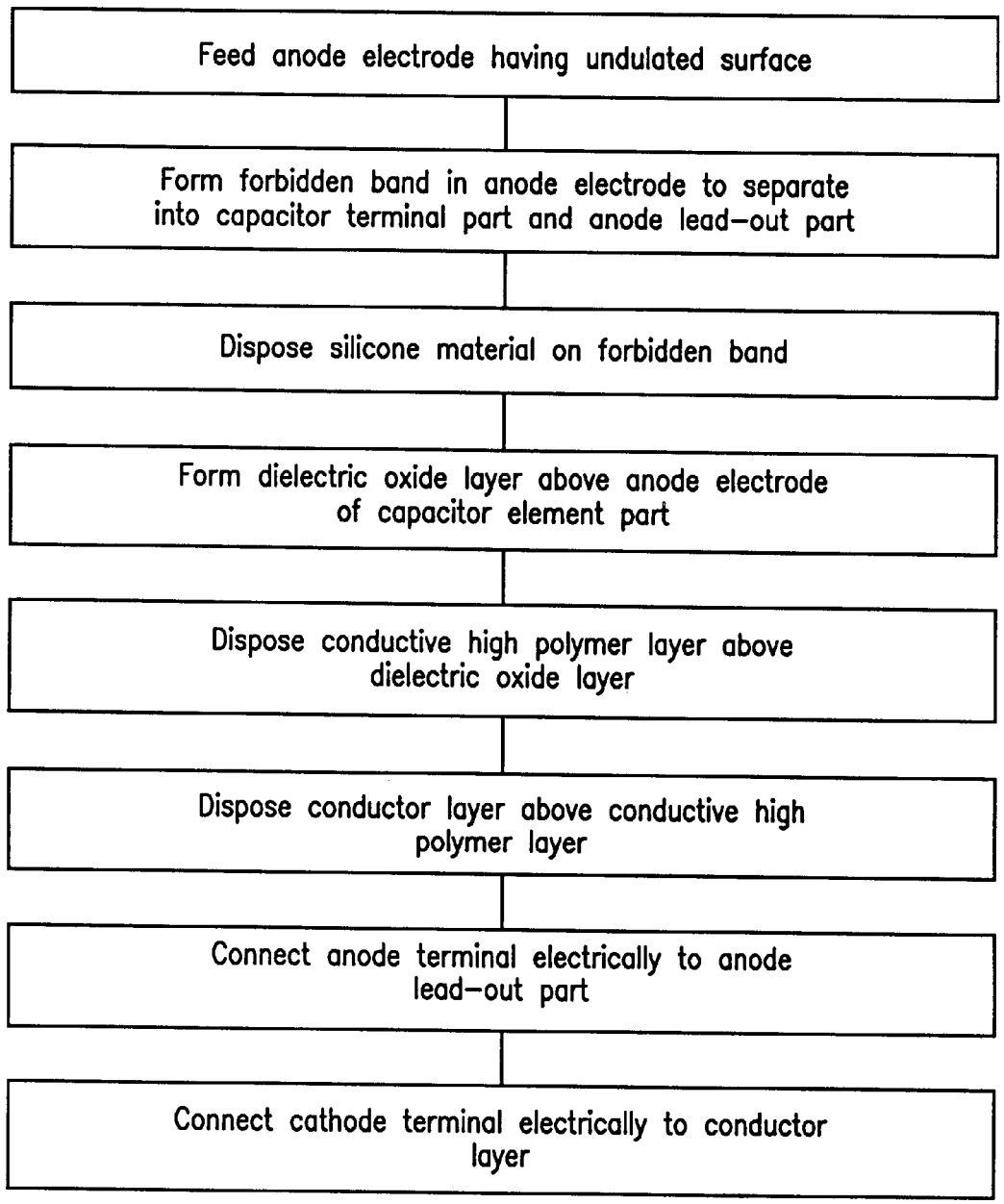
FIG. 7 is a process chart of manufacturing method of a solid electrolytic-capacitor in an embodiment of the invention.

A specific manufacturing method is described while referring to FIG. 1(*a*), FIG. 1(*b*), and FIG. 7. FIG. 7 shows the process of manufacturing method of a solid electrolytic capacitor in the embodiment of the invention.

In FIG. 1(*a*), FIG. 1(*b*), and FIG. 7, by etching an aluminum foil, an aluminum etched foil of 3 mm×4 mm was obtained. The anode electrode 10 having such undulated surface was fabricated. Using 3% aqueous solution of ammonium adipate, anodic oxidation was performed in the regions except the anode lead-out part 13 and forbidden band 12 of the aluminum etched foil, in the condition of applied voltage of 12 V, aqueous solution temperature of 70 degrees, and 60 minutes. Thus, the dielectric layer 14 was formed on the capacitor element part 11 of the etched foil. Then the silicone material 19 was applied on the surface of the anode electrode having the undulated surface. In this process, the forbidden band 12 adhering the silicone material 19 was formed. Consequently, the surface of the dielectric oxide layer 14 was immersed in 30% aqueous solution of manganese nitrate, dried in air, and heated at 300 degrees for 10 minutes. In this process, a manganese oxide layer forming a part of the solid electrolyte layer was formed on the surface of the dielectric oxide layer 14. Separately, to form the solid electrolyte layer, a monomer mixed solution was prepared. This monomer mixed solution was prepared in a step of mixing 0.5 mol/liter of pyrrole monomer and 0.1 mol/liter of sodium propylnaphthalene sulfonate, and a step of adding water as solvent, and ester propylphosphate as a pH regulator to adjust to pH 2. In this monomer mixed solution, electrolytic oxidation polymerization was performed while bringing the polymerization starting electrode closer to the surface of the capacitor element part 11. In this way, a conductive high polymer layer 14 as a solid electrolyte layer was formed on the dielectric oxide layer 14. Then, as the cathode lead-out layer, a colloidal carbon suspension was applied and dried. In this process, a carbon layer was formed. On this carbon layer, a silver paste was applied and dried. As a result, a silver layer was formed. Thus, the conductor layer 16 having carbon layer and silver layer was formed. This conductor layer 16 plays a role of cathode lead-out part. The obtained sample was mounted by using epoxy resin, and a solid electrolytic capacitor was completed.

In this exemplary embodiment, aluminum foil was used as an anode electrode having valve metal, but not limited to this, tantalum, niobium, zirconium, titanium or other may be used. It is also possible to use the sinter obtained by sintering a metal powder. Such sinter has a porous undulated surface.

Exemplary Embodiment 2

Figure 2A:
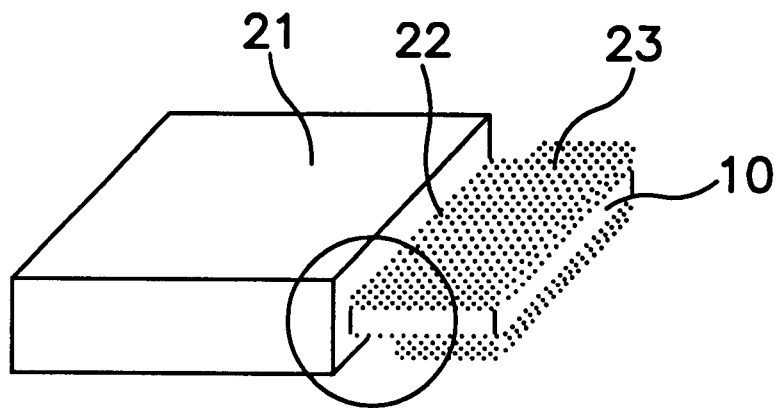
FIG. 2(a) is a perspective view showing a constitution of a solid electrolytic capacitor in other embodiment of the invention.
Figure 2B:
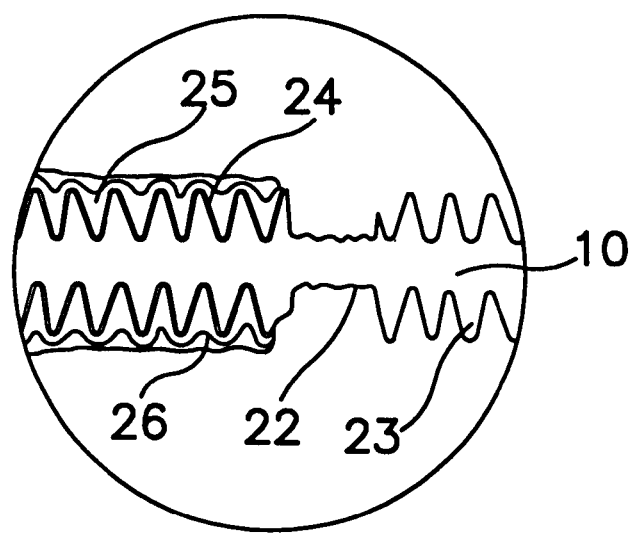
FIG. 2(b) is an essential magnified sectional view of the solid electrolytic capacitor shown in FIG. 2(a).

FIG. 2(*a*) is a perspective view showing a constitution of a solid electrolytic capacitor in other embodiment of the invention, and FIG. 2(*b*) is an essential magnified sectional view thereof. In FIG. 2(*a*) and FIG. 2(*b*), a solid electrolytic capacitor includes a capacitor element part 21, a forbidden band 22, an anode lead-out part 23, a dielectric oxide layer 24, a conductive high polymer layer 25, and a conductor layer 26. The capacitor element part 21 is made of an aluminum foil, and this aluminum foil has a roughened undulated surface. The forbidden band 22 has a compressed part 22 formed by pressing the undulated surface of aluminum foil. That is, the compressed part 22 has a smaller surface area than the undulated surface. The capacitor element 21 is separated from the anode lead-out part 23 by this forbidden band 22. The dielectric oxide layer 24 is formed on the surface of the capacitor element part 21. On the surface of this dielectric oxide layer 24, a conductive high polymer layer 25 made of polypyrrole is formed. On the conductive high polymer layer 25, a conductor layer 26 made of carbon layer and silver paint layer is laminated and formed sequentially. The conductive high polymer layer 25 and conductor layer 26 were formed in the same condition as in embodiment 1.

Exemplary Embodiment 3

Figure 3A:
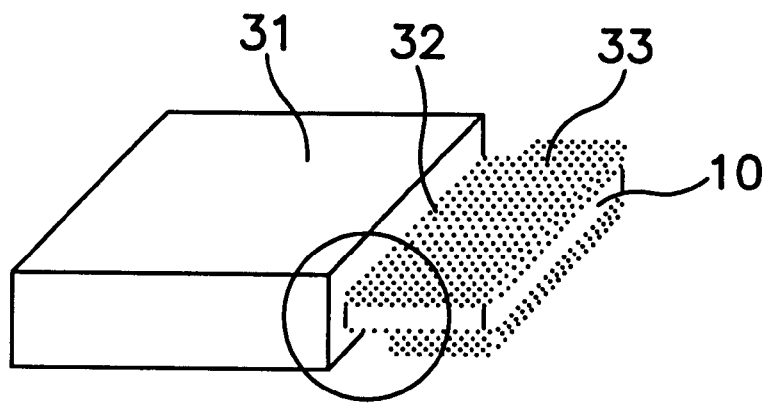
FIG. 3(a) is a perspective view showing a constitution of a solid electrolytic capacitor in a different embodiment of the invention.
Figure 3B:
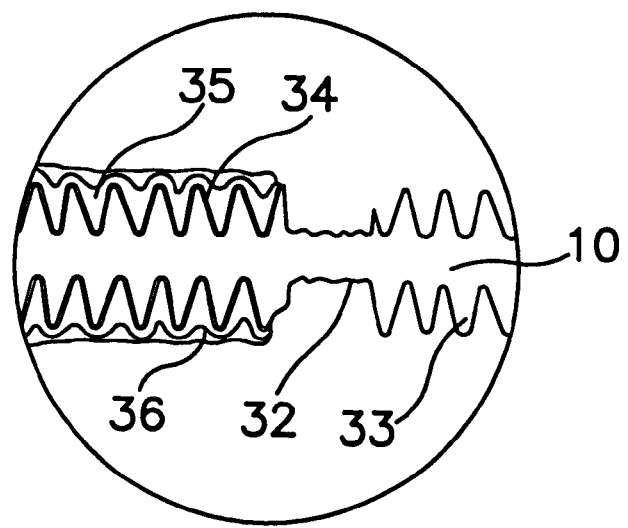
FIG. 3(b) is an essential magnified sectional view of the solid electrolytic capacitor shown in FIG. 3(a).

FIG. 3(a) is a perspective view showing a constitution of a solid electrolytic capacitor in a different embodiment of the invention, and FIG. 3(b) is an essential magnified sectional view thereof. In FIG. 3(a) and FIG. 3(b), a solid electrolytic capacitor includes a capacitor element part 31, a forbidden band 32, an anode lead-out part 33, a dielectric oxide layer 34, a conductive high polymer layer 35, and a conductor layer 36. The capacitor element part 31 is made of an aluminum foil, and this aluminum foil has a roughened undulated surface. The forbidden band 32 has a molten condensed part formed by melting the undulated surface of aluminum foil by laser processing. That is, the molted compressed part 32 has a smaller surface area than the undulated surface. The capacitor element 31 is separated from the anode lead-out part 33 by this forbidden band 32. The dielectric oxide layer 34 is formed on the surface of the capacitor element part 31. On the surface of this dielectric oxide layer 34, a conductive high polymer layer 35 made of polypyrrole is formed. On the conductive high polymer layer 35, a conductor layer 36 made of carbon layer and silver paint layer is laminated and formed sequentially. The conductive high polymer layer 35 and conductor layer 36 were formed in the same condition as in embodiment 1.

Exemplary Embodiment 4

Figure 4A:
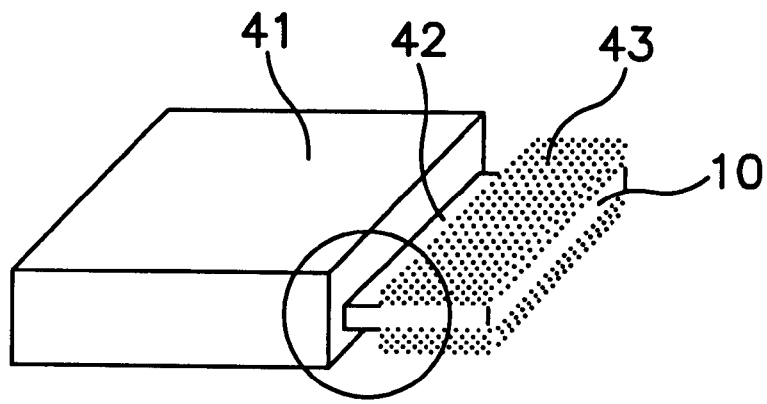
FIG. 4(a) is a perspective view showing a constitution of a solid electrolytic capacitor in another embodiment of the invention.
Figure 4B:
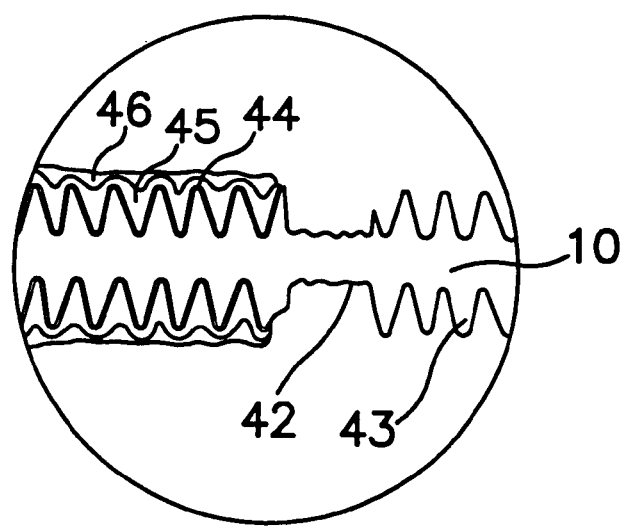
FIG. 4(b) is an essential magnified sectional view of the solid electrolytic capacitor shown in FIG. 4(a).

FIG. 4(a) is a perspective view showing a constitution of a solid electrolytic capacitor in another embodiment of the invention, and FIG. 4(b) is an essential magnified sectional view thereof. In FIG. 4(a) and FIG. 4(b), a solid electrolytic capacitor includes a capacitor element part 41, a forbidden band 42, an anode lead-out part 43, a dielectric oxide layer 44, a conductive high polymer layer 45, and a conductor layer 46. The capacitor element part 41 is made of an aluminum foil, and this aluminum foil has a roughened undulated surface. The forbidden band 42 has a split groove 42 formed by cutting and removing the undulated surface of aluminum foil. The split groove 42 has a shape of cutting off the undulated portion so that the base material of the aluminum foil may be exposed. That is, the split groove 42 has a smaller surface area than the undulated surface. The capacitor element 41 is separated from the anode lead-out part 43 by this forbidden band 42. The dielectric oxide layer 44 is formed on the surface of the capacitor element part 41. On the surface of this dielectric oxide layer 44, a conductive high polymer layer 45 made of polypyrrole is formed. On the conductive high polymer layer 45, a conductor layer 46 made of carbon layer and silver paint layer is laminated and formed sequentially. The conductive high polymer layer 45 and conductor layer 46 were formed in the same condition as in embodiment 1.

Exemplary Embodiment 5

Figure 5A:
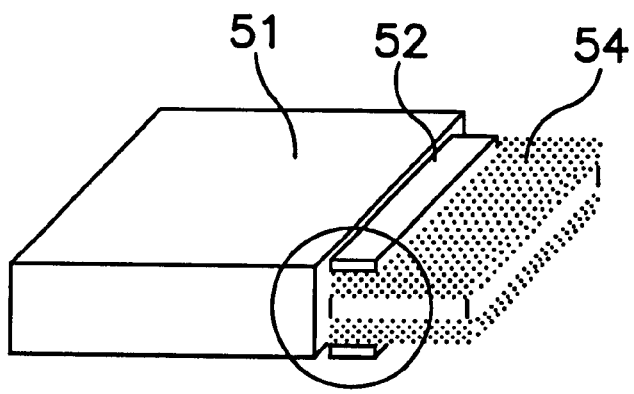
FIG. 5(a) is a perspective view showing a constitution of a solid electrolytic capacitor in a further different embodiment of the invention.
Figure 5B:
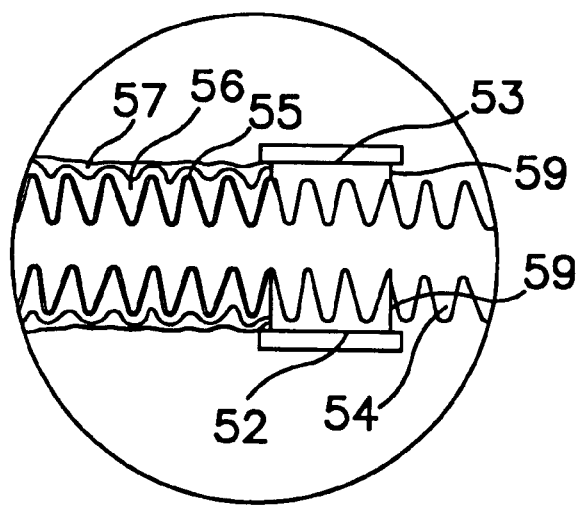
FIG. 5(b) is an essential magnified sectional view of the solid electrolytic capacitor shown in FIG. 5(a).

FIG. 5(a) is a perspective view showing a constitution of a solid electrolytic capacitor in a further different embodiment of the invention, and FIG. 5(b) is an essential magnified sectional view thereof. In FIG. 5(a) and FIG. 5(b), a solid electrolytic capacitor includes a capacitor element part 51, silicone material 59 disposed on a forbidden band 52, a silicone resist tape 53, an anode lead-out part 54, a dielectric oxide layer 55, a conductive high polymer layer 56, and a conductor layer 57. The capacitor element part 51 is made of an aluminum foil, and this aluminum foil has a roughened undulated surface. The low molecular silicone 59 having polysiloxane of dimer to vigesimer of silicone is disposed on the undulated surface of the forbidden band 52. The silicone resist tape 53 is glued so as to cover the forbidden band 52. The silicone material 59 is a low molecular silicone, and this low molecular silicone 59 plays a role of silicone adhesive. That is, this constitution is formed by disposing the tape having the heat resisting tape material 53 and the silicone adhesive 59 adhered to this heat resisting tape material, on the undulated surface of the aluminum foil. The capacitor element 51 is separated from the anode lead-out part 54 by the forbidden band 52, silicone material 59, and silicone resist tape 53. The dielectric oxide layer 55 is formed on the surface of the capacitor element part 51. On the surface of this dielectric oxide layer 55, a conductive high polymer layer 56 made of polypyrrole is formed. On the conductive high polymer layer 56, a conductor layer 57 made of carbon layer and silver paint layer is laminated and formed sequentially. The conductive high polymer layer 56 and conductor layer 57 were formed in the same condition as in embodiment 1. In the embodiment, meanwhile, in order to confirm the effect of the resist tape 53, a sample 5A having the resist tape 53 in a width nearly same as the width of the forbidden band 52, and a sample 5B having the resist tape 53 in a width broader than the width of the forbidden band 52 by about 0.4 mm were prepared.

Exemplary Embodiment 6

Figure 6:
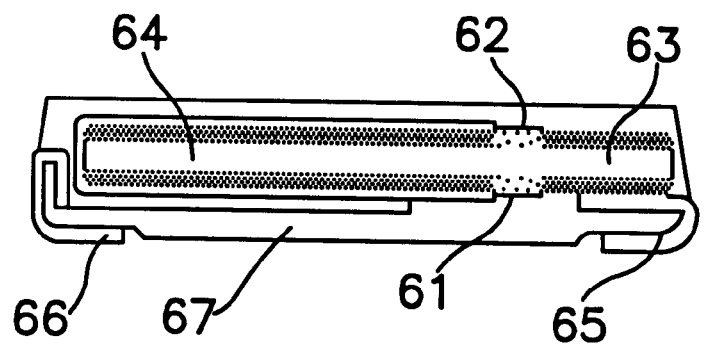
FIG. 6 is a sectional view showing assembled state and external state of a solid electrolytic capacitor in an embodiment of the invention.

FIG. 6 is a sectional view showing assembled state and external state of a solid electrolytic capacitor in an embodiment of the invention. An anode terminal 65 is electrically connected to an anode lead-out part 64 separated from a forbidden band 61 by a resisttape 62. A cathode terminal 66 is electrically connected to the separated capacitor element part 63. It is molded and formed by an external resin 67 made of epoxy. The projecting anode terminal 65 and cathode terminal 66 are folded along the side and bottom of the external resin 67.

Exemplary Embodiment 7

Figure 8:
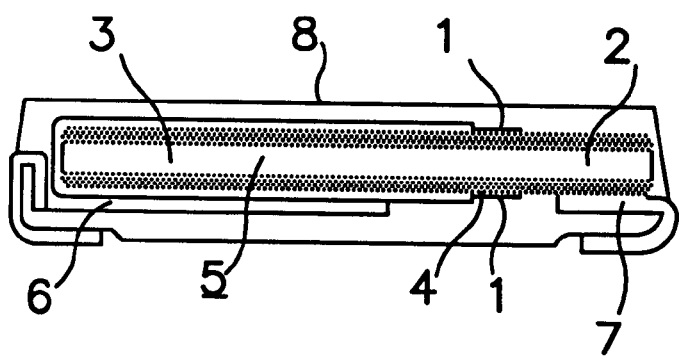
FIG. 8 is a sectional view showing a constitution of a conventional solid electrolytic capacitor.

In thus prepared aluminum solid electrolytic capacitors, and the conventional aluminum solid electrolytic capacitor shown in FIG. 8, the basic electric performance and leak current yield of aluminum solid electrolytic capacitor were measured. The leak current yield is the rate of samples having leak current of 4 $\mu$A or less in 200 samples. Results of measurement are summarized in Table 1. In each one of exemplary embodiments 1 to 5, 200 samples were measured, and the average of 200 samples is shown in Table 1.

TABLE 1

(Rating: 4 V, 56 $\mu$F, average of 200 samples, tan δ: 1 kHz value)

| | | Basic electric performance | | | |
|---|---|---|---|---|---|
| | | Electro-static capacity ($\mu$F) | tan δ (%) | Leak current ($\mu$A) | Leak current yield (%) |
| Exemplary embodiment 1 | 24 hr standing | 57.4 | 1.9 | 0.34 | 86.5 |
| | 48 hr standing | 57.3 | 1.9 | 0.35 | 88.5 |
| | 96 hr standing | 56.6 | 1.7 | 0.28 | 94.0 |
| | 144 hr standing | 56.5 | 1.7 | 0.29 | 95.0 |
| Exemplary embodiment 2 | | 56.4 | 1.7 | 0.28 | 94.5 |
| Exemplary embodiment 3 | | 56.7 | 1.8 | 0.30 | 92.5 |

TABLE 1-continued (Rating: 4 V, 56 μF, average of 200 samples,
tan δ: 1 kHz value)

| | Basic electric performance | | | |
|---|---|---|---|---|
| | Electro-static capacity (μF) | tan δ (%) | Leak current (μA) | Leak current yield (%) |
| Exemplary embodiment 4 | 57.0 | 1.7 | 0.33 | 90.5 |
| Exemplary embodiment 5  5A, same width | 56.6 | 1.6 | 0.30 | 95.0 |
| 5B, broader width | 56.4 | 1.7 | 0.27 | 95.5 |
| Prior art | 57.9 | 2.1 | 0.34 | 82.0 |

As clear from Table 1, the aluminum solid electrolytic capacitors of exemplary embodiments 1 to 5 have same or better basic electric performance as compared with the conventional aluminum solid electrolytic capacitor, but the aluminum solid electrolytic capacitors of the embodiments have a higher leak current yield than the conventional aluminum solid electrolytic capacitor. That is, the aluminum solid electrolytic capacitors of the embodiments have both excellent basic electric performance and excellent leak current yield. More specifically, permeation of the conductive high polymer layer into the anode lead-out part is prevented by the forbidden band.

In particular, in the measured result of samples of embodiment 1, the leak current yield is extremely improved by inserting a control step for letting stand for at least about 96 hours or more between the step of disposing the silicone material and the step of forming the next dielectric oxide layer. In the measured result of samples of embodiment 5, the leak current yield is slightly improved by disposing a heat resisting tape wider than the width of the forbidden band to cover the forbidden band. However, the effect of using this wider silicone tape is smaller than the effect of disposing the forbidden band. That is, the tape wider than the width of the forbidden band is effective to prevent further permeation of the conductive high polymer layer formed beyond the forbidden band. Accordingly, permeation of the conductive high polymer layer into the anode lead-out part is stably prevented.

Or when the resist tape is disposed to cover the forbidden band 22 compressed and formed by pressing in the samples of exemplary embodiment 2, the forbidden band 32 formed by melting and condensing by laser processing in exemplary embodiment 3, or the forbidden band formed by cutting and removing in exemplary embodiment 4, the same or better basic electric performance as compared with the prior art is shown, and an extremely excellent leak current yield as compared with the prior art is obtained.

Exemplary Embodiment 8

In exemplary embodiments 1 to 5, the conductive high polymer layer is formed by electrolytic oxidation polymerization, but not limited to this constitution, the conductive high polymer layer can be formed also by chemical oxidation polymerization method. In this constitution, too, the same action and effect as mentioned above are obtained. A specific example of this chemical oxidation polymerization method is described below.

Tantalum powder was pressed, formed, and sintered in vacuum, and an anode electrode of 0.9 mm in thickness, 2.0 mm in width, and 1.3 mm in length was obtained as porous valve metal. This porous valve metal has leads. The surface of the anode electrode was treated by anodic oxidation at 30 V in a phosphoric acid aqueous solution at concentration of 5 wt. %, and a dielectric oxide layer was formed on the surface of the anode electrode. This sample was immersed in an aqueous solution containing 0.7 mol/liter of complex ring compound or its derivative pyrrole monomer, a surface active agent, and 0.05 mol/liter of naphthalene sulfonate as dopant. In succession, immersing in an oxidation solution containing surface active agent, 0.05 mol/liter of iron salt of naphthalene sulfonate, liquid phase chemical oxidation polymerization was performed. Successively bleaching in pyrrole monomer steam at 0° C. for 30 minutes, vapor phase chemical oxidation polymerization was carried out. Then, by washing in running water of ion exchange water for 10 minutes, the residue of the oxidizing agent was removed. It was then dried at 105° C. for 10 minutes. Such chemical oxidation polymerization was repeated 15 times. Thus, a solid electrolyte layer composed of conductive high polymer was formed. On the solid electrolyte layer of conductive high polymer, colloidal graphite and silver paint were applied. A specified appearance was applied. As a result, a solid electrolytic capacitor was formed. Thus fabricated solid electrolytic capacitor had the same or better basic electric performance as compared with the conventional solid electrolytic capacitor, and had a higher leak current yield than the conventional solid electrolytic capacitor.

Thus, the solid electrolytic capacitor of the invention has a forbidden band for forming a boundary portion of the anode lead-out part and capacitor element part, and this forbidden band prevents permeation of conductive high polymer material into the anode lead-out part. By preventing the conductive high polymer layer from reaching the anode lead-out part, occurrence of defective insulation is prevented, and the probability of leading to insulation breakdown is notably decreased. Without sacrificing the productivity of the conventional solid electrolytic capacitor, the solid electrolytic capacitor having same or better basic electric performance than the confessional electrolytic capacitor is obtained.

Moreover, in the constitution in which the resist material is disposed on the forbidden band, the forbidden band prevents permeation of conductive high polymer material, and it hence prevents occurrence of defective insulation due to the conductive high polymer layer reaching the anode lead-out part, or notably decreases the probability of leading to insulation breakdown. Further, the resist material disposed on the forbidden band prevents formation of the conductive high polymer layer in the anode led-out part by surpassing the forbidden band, and hence prevention of defective insulation and prevention of insulation breakdown may be extremely enhanced. The effect of the forbidden band and the effect of the resist material are combined together to produce further effects. As a result, the solid electrolytic capacitor having such effects is securely obtained.

These effects are moreover enhanced in the constitution in which the forbidden band or resist material is made of a material having a strong water repelling and heat resisting properties such as silicone.

By using the valve metal of roughed foil surface, the distance from the surface of the roughened layer to the deep part can be shortened. Therefore, the forbidden band can be easily formed securely into the inner parts of the roughened layer. As a result, the aforesaid effects are more securely obtained.

What is claimed is:

1. A solid electrolytic capacitor comprising:
    an anode electrode having a capacitor element part, forbidden band, an anode lead-out part, and a valve metal forming at least one layer with at least one of a roughened surface and a porous surface, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, a conductor layer disposed above said conductive high polymer layer, an anode terminal connected electrically to said anode lead-out part, and a cathode terminal connected electrically to said conductor layer.

2. A solid electrolytic capacitor comprising:

an anode electrode having a capacitor element part, forbidden band, an anode lead-out part, and at least one undulated layer with at least one of a roughened surface and a porous surface, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, a conductor layer disposed above said conductive high polymer layer, an anode terminal connected electrically to said anode lead-out part, and a cathode terminal connected electrically to said conductor layer.

3. A solid electrolytic capacitor comprising:

an anode electrode having a capacitor element part, forbidden band, an anode lead-out part, and at least one undulated layer with at least one of a roughened surface and a porous surface, said at least one undulated layer has concave portions and convex portions, said forbidden band has a silicone layer disposed on the surface of said concave portions and on the surface of said convex portions, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, a conductor layer disposed above said conductive high polymer layer, an anode terminal connected electrically to said anode lead-out part, and a cathode terminal connected electrically to said conductor layer.

4. The solid electrolytic capacitor of claim 1, wherein said anode electrode has at least one undulated layer with at least one of a roughened surface and porous surface, said at least one undulated layer has concave portions and convex portions, said forbidden band has a silicone layer disposed on the surface of said concave portions and on the surface of said convex portions, and said silicone layer has a low molecular silicone of polysiloxane in a range of dimer to vigesimer of silicone.

5. A solid electrolytic capacitor comprising:

an anode electrode having a capacitor element part, forbidden band, an anode lead-out part, and a valve metal having at least one undulated layer with at least one of a roughened surface and a porous surface, said forbidden band has a processed part having a smaller surface area than the surface area of the undulated layer, said processed part has a compressed layer formed by compressing said undulated layer, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, a conductor layer disposed above said conductive high polymer layer, an anode terminal connected electrically to said anode lead-out part, and a cathode terminal connected electrically to said conductor layer.

6. A solid electrolytic capacitor comprising:

an anode electrode having a capacitor element part, forbidden band, an anode lead-out part, and a valve metal having at least one undulated layer with at least one of a roughened surface and a porous surface, said forbidden band has a processed part having a smaller surface area than the surface area of the undulated layer, said processed part has a molten condensed layer formed by melting and condensing said undulated layer, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, a conductor layer disposed above said conductive high polymer layer, an anode terminal connected electrically to said anode lead-out part, and a cathode terminal connected electrically to said conductor layer.

7. A solid electrolytic capacitor comprising:

an anode electrode having a capacitor element part, forbidden band, an anode lead-out part, and a valve metal having at least one undulated layer with at least one of a roughened surface and a porous surface, said at least one undulated layer has concave portions and convex portions, said forbidden band has a split groove formed by removing the convex portions, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, a conductor layer disposed above said conductive high polymer layer, an anode terminal connected electrically to said anode lead-out part, and a cathode terminal connected electrically to said conductor layer.

8. The solid electrolytic capacitor of claim 1, wherein said anode electrode has a valve metal having at least one undulated layer with at least one of a roughened surface and a porous surface, and said valve metal is a foil.

9. The solid electrolytic capacitor of claim 1, wherein said anode electrode has a valve metal having at least one undulated layer with at least one of a roughened surface and a porous surface, and said valve metal has at least one selected from the group consisting of aluminum, tantalum, niobium, zirconium, titanium, a complex containing at least two of them, and an alloy containing at least two of them.

10. A solid electrolytic capacitor comprising:

an anode electrode having a capacitor element part, forbidden band, and an anode lead-out part, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, said conductive high polymer layer has a product formed by electrolytic oxidation polymerization, a conductor layer disposed above said conductive high polymer layer, an anode terminal connected electrically to said anode lead-out part, and a cathode terminal connected electrically to said conductor layer.

11. A solid electrolytic capacitor comprising:

an anode electrode having a capacitor element part, forbidden band, and an anode lead-out part, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, said conductive high polymer layer has a product formed by electrolytic oxidation polymerization of at least one monomer of complex five-ring compound and its derivatives, and aryl sulfonic acid as dopant, a conductor layer disposed above said conductive high polymer layer, an anode terminal connected electrically to said anode lead-out part, and a cathode terminal connected electrically to said conductor layer.

12. A solid electrolytic capacitor comprising:

an anode electrode having a capacitor element part, forbidden band, and an anode lead-out part, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, a conductor layer disposed above said conductive high polymer layer, an anode terminal connected electrically to said anode lead-out part, a cathode terminal connected electrically to said conductor layer, and a resist material disposed on said forbidden band.

13. The solid electrolytic capacitor of claim 1, further comprising a resist material disposed on said forbidden band, wherein said anode electrode has at least one undulated layer with at least one of a roughened surface and a porous surface, said at least one undulated layer has concave portions and convex portions, said resist material has a tape including a heat insulating tape material and a silicone adhesive disposed on said heat resisting tape material, and said forbidden band has a silicone diffused layer having a shape as if said silicone adhesive were disposed on the surface of said concave portions and on the surface of said convex portions.

14. The solid electrolytic capacitor of claim 1, further comprising a resist material disposed on said forbidden band, wherein said anode electrode has at least one undulated layer with at least one of a roughened surface and a porous surface, said at least one undulated layer has concave portions and convex portions, said resist material has a tape including a heat insulating tape material and a silicone adhesive disposed on said heat resisting tape material, said forbidden band has a silicone diffused layer having a shape as if said silicone adhesive were disposed on the surface of said concave portions and on the surface of said convex portions, and said silicone adhesive has a low molecular silicone of polysiloxane in a range of dimer to vigesimer of silicone.

15. The solid electrolytic capacitor of claim 1, further comprising a resist material disposed on said forbidden band, wherein said anode electrode has at least one undulated layer with at least one of a roughened surface and porous surface, said at least one undulated layer has concave portions and convex portions, said resist material has a tape including a heat insulating tape material and a silicone adhesive disposed on said heat resisting tape material, said forbidden band has a silicone diffused layer having a shape as if said silicone adhesive were disposed on the surface of said concave portions and on the surface of said convex portions, and said tape has a broader width than the width of said forbidden band.

16. The solid electrolytic capacitor of claim 1, further comprising a resist material disposed on said forbidden band, wherein said anode electrode has a valve metal having at least one undulated layer with at least one of a roughened surface and a porous surface, said at least one undulated layer has concave portions and convex portions, said forbidden band has a processed part having a smaller surface area than the surface area of the undulated layer, and said processed part has a compressed layer formed by compressing said undulated layer.

17. The solid electrolytic capacitor of claim 1, further comprising a resist material disposed on said forbidden band, wherein said anode electrode has a valve metal having at least one undulated layer with at least one of a roughened surface and a porous surface, said at least one undulated layer has concave portions and convex portions, said forbidden band has a processed part having a smaller surface area than the surface area of the undulated layer, and said processed part has a molten condensed layer formed by melting and condensing said undulated layer.

18. The solid electrolytic capacitor of claim 1, further comprising a resist material disposed on said forbidden band, wherein said anode electrode has a valve metal having at least one undulated layer with at least one of a roughened surface and a porous surface, said at least one undulated layer has concave portions and convex portions, and said forbidden band has a split groove formed by removing the convex portions.

19. The solid electrolytic capacitor of claim 1, further comprising a resist material disposed on said forbidden band, wherein said anode electrode has a valve metal having at least one undulated layer with at least one of a roughened surface and a porous surface, and said valve metal is a foil.

20. The solid electrolytic capacitor of claim 1, further comprising a resist material disposed on said forbidden band, wherein said anode electrode has a valve metal having at least one undulated layer with at least one of a roughened surface and a porous surface, and said valve metal has at least one selected from the group consisting of aluminum, tantalum, niobium, zirconium, titanium, a complex containing at least two of them, and an alloy containing at least two of them.

21. A solid electrolytic capacitor comprising:

an anode electrode having a capacitor element part, forbidden band, and an anode lead-out part, said forbidden band having a boundary portion placed between said capacitor element part and anode lead-out part so as to separate said capacitor element part and anode lead-out part, a dielectric oxide layer disposed on said capacitor element part, a conductive high polymer layer disposed above said dielectric oxide layer, said conductive high polymer layer has a product formed by electrolytic oxidation polymerization of complex five-ring compound, at least one monomer of its derivatives, and aryl sulfonic acid as dopant, a conductor layer disposed above said conductive high polymer layer, an anode terminal connected electrically to said anode lead-out part, a cathode terminal connected electrically to said conductor layer, and a resist material disposed on said forbidden band.

* * * * *